United States Patent
Coles et al.

(10) Patent No.: US 9,122,898 B2
(45) Date of Patent: Sep. 1, 2015

(54) SYSTEMS AND METHODS FOR PROCESSING DOCUMENTS OF UNKNOWN OR UNSPECIFIED FORMAT

(75) Inventors: Scott Coles, Waverton (AU); Derek Murphy, Highland Ranch, CO (US); Ben Truscott, Crows Nest (AU); Ian Davies, Cammeray (AU)

(73) Assignee: Lexmark International Technology SA, Meyrin (CH)

( * ) Notice: Subject to any disclaimer, the term of this patent is extended or adjusted under 35 U.S.C. 154(b) by 325 days.

(21) Appl. No.: 13/427,506

(22) Filed: Mar. 22, 2012

(65) Prior Publication Data

US 2013/0077855 A1   Mar. 28, 2013

(51) Int. Cl.
*G06K 9/00* (2006.01)
*G06F 17/27* (2006.01)

(52) U.S. Cl.
CPC . *G06K 9/00* (2013.01); *G06F 17/27* (2013.01)

(58) Field of Classification Search
CPC ............... G06K 9/00; G06K 9/00872; G06K 9/72–9/726; G06F 17/30554
USPC ......................................................... 382/155
See application file for complete search history.

(56) References Cited

U.S. PATENT DOCUMENTS

| | | | |
|---|---|---|---|
| 5,675,665 A * | 10/1997 | Lyon | 382/229 |
| 2003/0005001 A1* | 1/2003 | Kataoka | 707/513 |
| 2003/0090397 A1* | 5/2003 | Rasmussen | 341/51 |
| 2008/0025559 A1* | 1/2008 | Paxson | 382/100 |
| 2008/0212773 A1* | 9/2008 | Houlberg | 380/200 |
| 2009/0210412 A1* | 8/2009 | Oliver et al. | 707/5 |
| 2009/0228468 A1* | 9/2009 | Qin et al. | 707/5 |
| 2010/0220930 A1* | 9/2010 | Sun et al. | 382/190 |
| 2013/0167133 A1* | 6/2013 | Cao et al. | 717/172 |

OTHER PUBLICATIONS (IBM et al.; "Method for Recognizing and Classifying Video Text and Video Characters Using Kernel-Space Methods"; Dec. 3, 2002; IP.com).*

* cited by examiner

*Primary Examiner* — Stephen R Koziol
*Assistant Examiner* — Totam Le (57) ABSTRACT

A computer implemented method for extracting meaningful text from a document of unknown or unspecified format. In a particular embodiment, the method includes reading the document, thereby to extract raw encoded text, analysing the raw encoded text, thereby to identify one or more text chunks, and for a given chunk, performing compression identification analysis to determine whether compression is likely. The method can further include performing a decompression process, performing an encoding identification process thereby to identify a likely character encoding protocol, and converting the chunk using the identified likely character encoding protocol, thereby to output the chunk as readable text.

22 Claims, 6 Drawing Sheets

SYSTEMS AND METHODS FOR PROCESSING DOCUMENTS OF UNKNOWN OR UNSPECIFIED FORMAT

TECHNICAL FIELD

The present technology relates to systems and methods for processing documents of unknown or unspecified format. Embodiments of the technology have been particularly developed for extracting meaningful text from such documents, thereby to allow the viewing and/or searching of a document, even where access to or knowledge of the native application responsible for generating that document is not available. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

In broad terms, there are two main techniques by which to read an electronic document. The first is to use the native application that generated the document. Such an application understands the file format, encoding, compression, and so on present in the document, and is able to use this knowledge to process the document thereby to provide the intended rendered output. The second technique is to open the document as raw encoded text using an application other than the native application. This extracts textual information (i.e. a stream of characters) from the document, but not in a meaningful manner. Often, the extracted textual information is substantially or entirely devoid of human language.

There is also a hybrid approach used by some applications, which first extracts raw encoded text, identifies the document format, and then applies a set of stored rules for processing that document format thereby to provide a rendered output. Often this rendered output is not as sophisticated as the intended rendered output (as would be provided by the native application), but is sufficient for viewing and/or searching purposes. The hybrid approach fails, however, for unknown document formats.

There is a need in the art for improved systems and methods for processing unknown document formats.

SUMMARY

The present technology overcomes or ameliorates at least one of the disadvantages of the prior art, and/or provides a useful alternative.

One embodiment of the present technology provides a computer implemented method for extracting meaningful text from a document of unknown or unspecified format, the method including the steps of:

reading the document, thereby to extract raw encoded text;

analysing the raw encoded text, thereby to identify one or more text chunks; and for a given chunk:

performing compression identification analysis to determine whether compression is likely and, in the event that compression is likely, performing a decompression process;

performing an encoding identification process thereby to identify a likely character encoding protocol; and converting the chunk using the identified likely character encoding protocol, thereby to output the chunk as readable text.

One embodiment of the present technology provides a learning method for identifying delimiters/markers in raw encoded text created using a native application, the method including:

inputting four documents created using the native application, the documents including:

an empty document;

a document defined by a first paragraph of text;

a document defined by the first paragraph of text followed immediately by a second paragraph of text; and a document defined by a document defined by the first paragraph of text followed immediately by a third paragraph of text, followed immediately by the second paragraph of text; and comparing those documents thereby to identify delimiters/markers.

One embodiment of the present technology provides a learning method for identifying delimiters/markers in raw encoded text created using a native application, the method including:

inputting a set of documents created using the native application;

receiving data indicative of known text portions known to exist in each of the documents;

processing the documents on the basis of a set of operations thereby to identify the known text portions;

based on the identification of the known text portions, identifying the delimiters/markers.

One embodiment of the present technology provides a method for determining a likely language/encoding protocol combination for a portion of raw encoded text, thereby to allow extraction of meaningful text, the method including:

inputting the raw encoded text;

setting a first language and encoding protocol combination;

scoring the language/protocol combination based on identification of words from a common word selection for that language/protocol combination;

repeating the scoring for additional language/protocol combinations;

identifying a likely language/protocol combination based on the relative scores.

One embodiment of the present technology provides a method for determining a likely language/encoding protocol combination for a portion of raw encoded text, thereby to allow extraction of meaningful text, the method including:

reading an input portion of the raw encoded text, the input portion having a first predetermined size;

processing the input portion, thereby to generate a set of n-grams;

for a plurality of dictionaries that each contain known n-grams in a respective language/character encoding combination, tallying the matches between the generated n-grams and known n-grams thereby to define a score for each dictionary;

normalising the scores; and identifying a likely language/protocol combination based on the relative scores.

One embodiment of the present technology provides a computer program product for performing a method as described herein.

One embodiment of the present technology provides a non-transitive carrier medium for carrying computer executable code that, when executed on a processor, causes the processor to perform a method as described herein.

One embodiment of the present technology provides a system, such as a computer system, configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the presently disclosed technology will now be described, by way of example only, with reference to the accompanying drawings in which.

DETAILED DESCRIPTION

Described herein are systems and methods for processing documents of unknown or unspecified format. Embodiments include methods (such as computer implemented methods), computer programs configured to perform such methods, carrier media embodying code for allowing a computer system to perform such methods, and computer systems configured to perform such methods. According to one embodiment, the method includes extracting raw encoded text from a document, and applying a process thereby to identify markers/delimiters (for example the beginnings and ends of sections), apply decompression (where necessary), and identify a most likely character encoding protocol. This allows for conversion of the raw encoded text into meaningful text.

Methodology Overview

Figure 1:
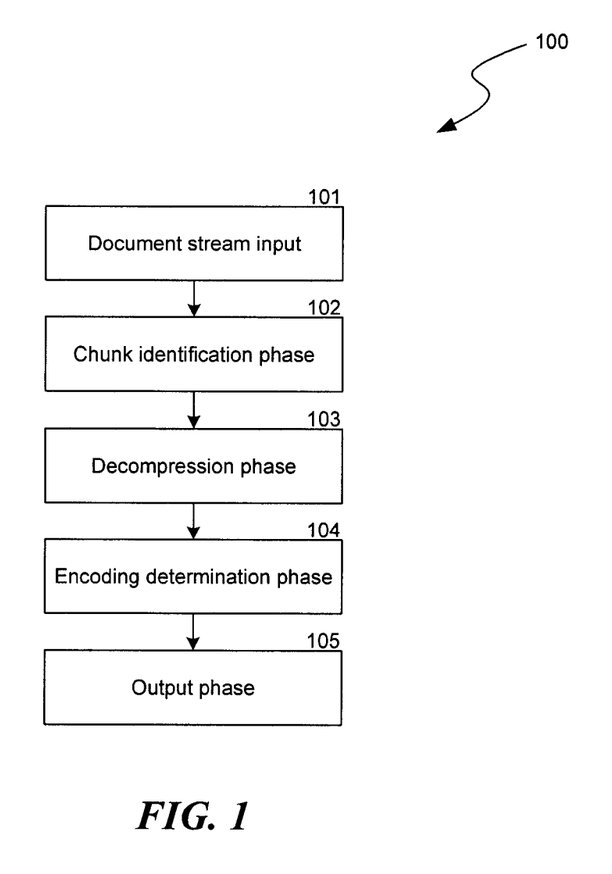
FIG. 1 schematically illustrates a method according to one embodiment.

FIG. 1 illustrates a method 100 for extracting meaningful text from a document of unknown or unspecified format according to one embodiment. This method, as with other methods discussed herein, is performed based on the execution of computer executable code via one or more processors of a computer system. The term "document of unknown or unspecified format" refers to a document for which a document rendering protocol is unknown or otherwise not available. That is, in some cases there may be knowledge as to the software application used to create the document, but not knowledge of the document rendering protocol required to render the document in a meaningful manner.

Method 100 commences with a document stream input phase 101. This includes reading a document thereby to extract raw encoded text. This raw encoded text may be encoded, encrypted, compressed, or the like. The native application for the document would be able to apply the relevant decoding, decryption, decompression, etc. as a matter of course. However, in the present context, this document is to be processed by a non-native application (i.e. computer program) configured to perform method 100.

The raw encoded text is, in essence, a stream of characters, and may not necessarily have any meaningful aspects in terms of human language. For example, shown below is a sample of raw encoded text extracted from an Adobe PDF document:

```
<</Length 585 0 R/Filter /FlateDecode>> stream xœÁ[ßo[õ‡'48C™¨='Élu˙*NA6÷‡ïµM¤á±,))Î°˙ p3P¨°fAW˙ ½ ñÔ¤!Œ´xj'_öà+©›OHE–;W‰˙Äq˙ü
         yÜ9ç{ïõ=_˙ßØlú0!š/Eþþ:¿>çsÏ÷[%®FûÍþùAqöòïˆJŸ9?>(F^½¨ûÒ[5rõ£Ygh
ÿ¢&ÒÓÓã©ÈÒàìÅ®f_ú--°ÜɵÊýZ³r˙ µJ[Áfe;ßÏ¨Êõ˙ Uµèó^p¸_/vÈ¸Ù¦±™µhòîÉ§Þ˙ke¸9
fn¬˙ ³pF˙ ˙ þåg²||-il±«kkl@e/Ó-˙*˙ J/kýgßIVZÕm ™      „»zsva'Óñ.|*‰¨- o–¼K ûs~¯ç‚—ðÁz˙wUÐ\Ù˙¨bZ:'Œ¨j'&˙/5…Œ4ëu1KK©=Eß‡½«©z:³¿Ål|ç+ß&QÆÐ˙ §¼s"FD|Z'

˙˙ f˙ÊWÈDÊ˙˙ _P%½+g:™VÈpQ|˙"[£Ï±±_õ˙ÙZ—„Â¼Ð¯ÚšH›ö*¿b"Júõ5ñkÚ°=Å½y¸þgú
ç˙éù˙˙˙ J¿Ò›æþYå›lc{®aøNýFURŽ}>bõIÚöé³lW¤¯°ª
`Å¸ÝE¦s ÊÜ@L¶˙z"N߆dÅ©       Ó¨_-7Viu6³%™ˆŕhˤ$v¼/Et|VÕAZÜy~õÒ_Øl?‡¨œÚÍõ™+%ÓöA,|ít=Ô°Bte˙B
/^æz˙DØ»P'©çÜY¸¢˙€ÎVè€ëüwßCW€ (£[©}}ÏPÞ†õ°Ôpa3×[§õB˙ û¯°˙Ár˙

¢å7˙ ˙ ˙†ó˙ wý-Ø'w™med|
8˙ò56*T¿E[ÜÚ
```

When read by a PDF reader application, such as Adobe Acrobat Reader, this raw encoded text is rendered in a meaningful format such as English language prose. However, in its raw encoded form, it will be appreciated that it carries little meaning as human readable text.

Phase 102 includes analyzing the raw encoded text, thereby to identify text "chunks". As used herein the term "chunk" describes a portion of text, optionally being a portion of text expected to define a sentence, paragraph, or the like. In some cases a document is defined by a single chunk. Chunks are identified by searching for markers and/or delimiters in the raw encoded text. The delimiters/markers are in some embodiments derived from a learning method, and examples of such learning methods are discussed further below, with reference to FIG. 2 and FIG. 3. As a general comment, some such learning methods leverage a set of comparison files generated using the application responsible for generating the document of unknown or unspecified format.

Decompression phase 103 includes performing, in respect of a given chunk, compression identification analysis to determine whether compression is likely and, in the event that compression is likely, performing a decompression process. Examples are discussed in more detail further below by reference to FIG. 4.

Encoding identification phase 104 includes, for a given chunk (decompressed, if required at phase 103), performing an encoding identification process thereby to identify a likely character encoding protocol. This is discussed in more detail below by reference to FIG. 5. In overview, the general notion is to process the chunk on the basis of a plurality of known character encoding protocols thereby to identify a most likely encoding protocol. The most likely encoding protocol is then used to allow conversion of the chunk to meaningful text (or at least text anticipated to be meaningful) for the purposes of output phase 105.

Phases 103 and 104 are in some embodiments performed on a chunk-by-chunk basis. That is, the compression identification analysis and encoding identification process are performed for each chunk (optionally for multiple chunks in parallel). In some cases the compression identification analysis and encoding identification process are performed in a modified manner for one or more later chunks based in input indicative of the results of the compression identification analysis and encoding identification process for one or more earlier chunks. For example, if a likely decompression technique and/or encoding protocol are identified, those may be applied to later chunks by default, or prioritized to streamline identification in respect of later chunks.

Phase 105 may also be performed on a chunk-by-chunk basis. In some embodiments phase 105 includes outputting an input file where all identified chunks are decompressed (if necessary) and decoded using the identified encoding protocol. This optionally provided a text document renderable by an available application for viewing by a client, and/or searching by a search engine. In some embodiments one or more chunks are deemed unprocessable, and excluded from the final output. This may include providing a note in the final output indicating that a chunk was omitted. The omitted chunk may, for example, be indicative of non-text data such as an image or the like. In some embodiments omitted chunks are passed for further processing, for example to a component able to recognize non-text data formats (such as JPEG, MPEG, MP4, and so on).

Learning Methods for Identifying Markers/Delimiters

Figure 2:
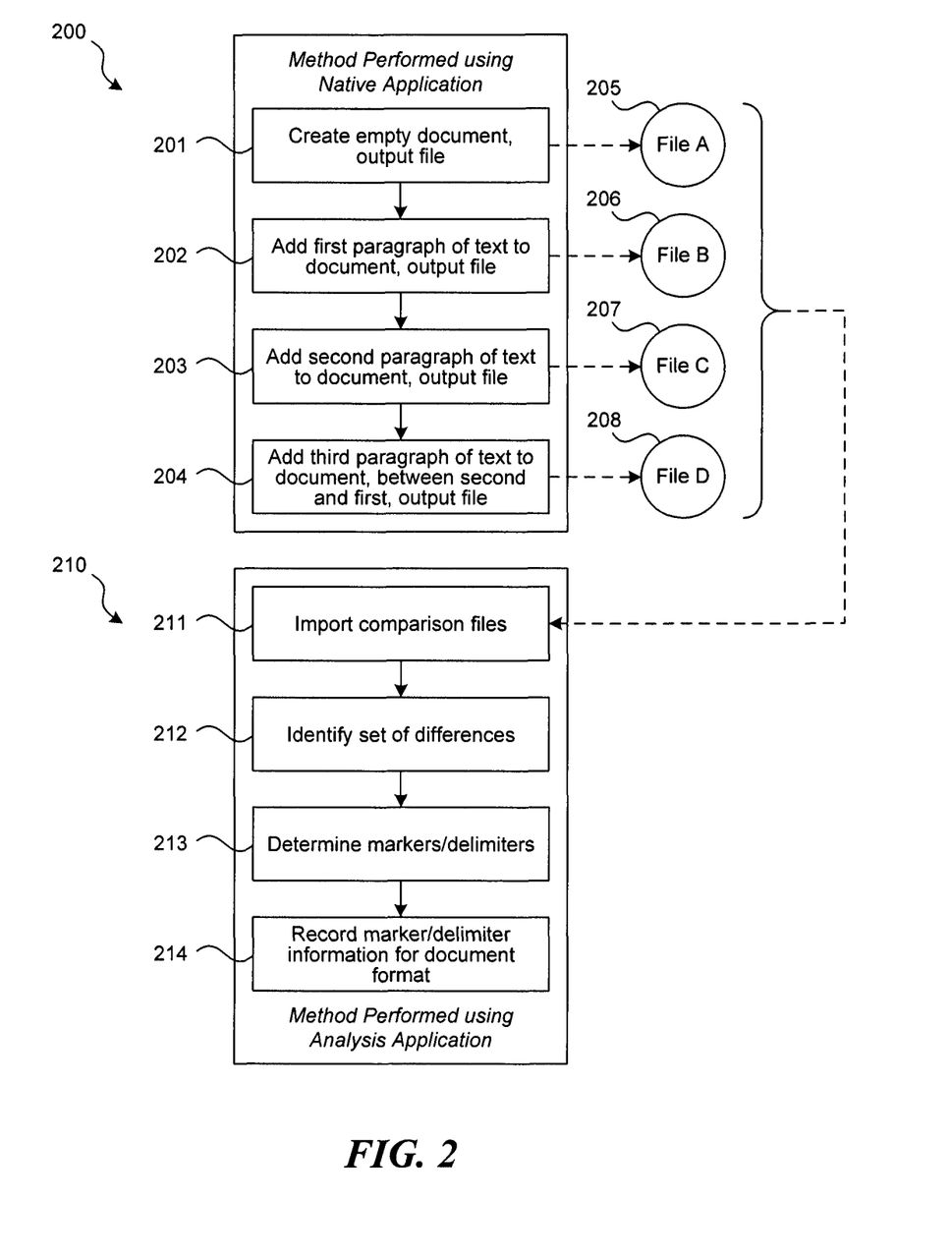
FIG. 2 schematically illustrates methods according to embodiments.
Figure 3:
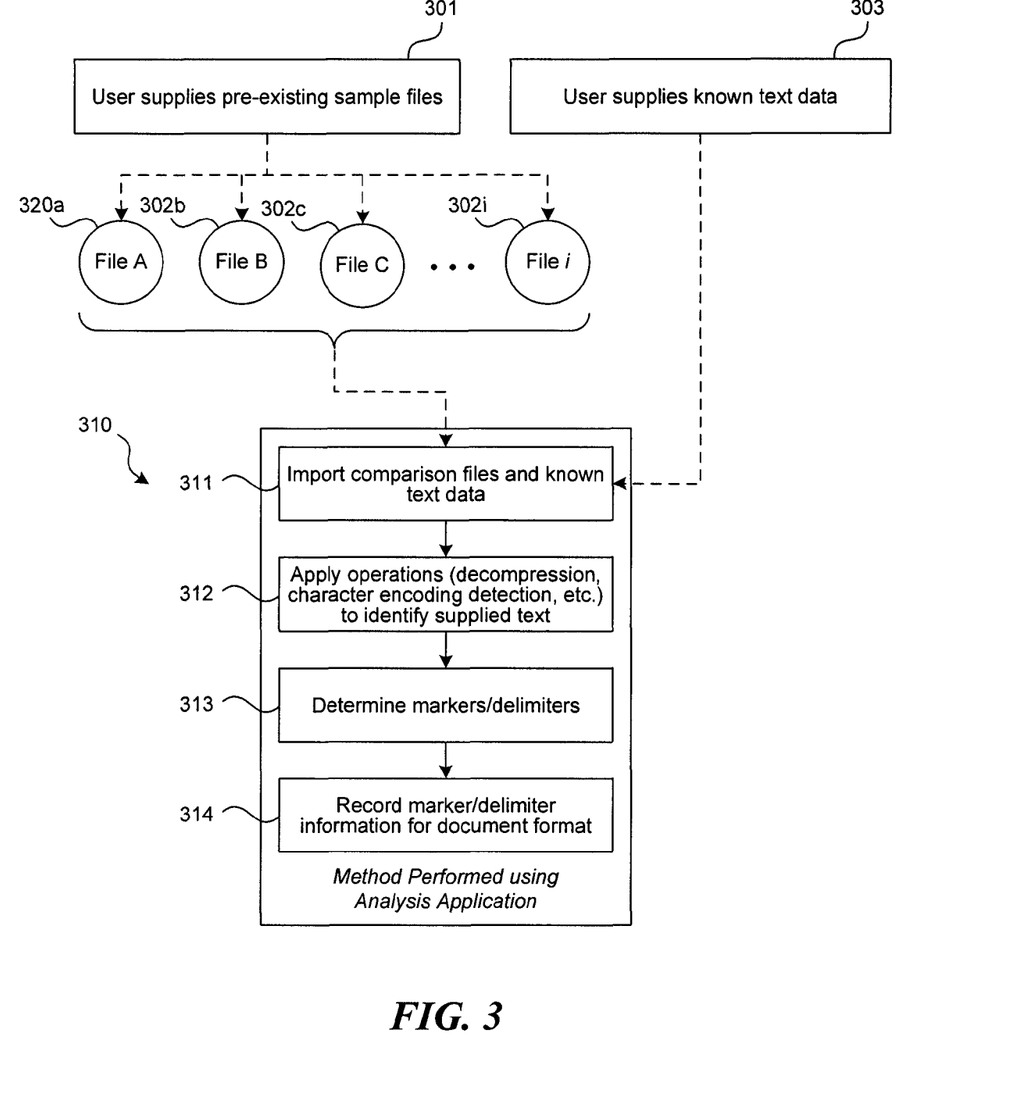
FIG. 3 schematically illustrates methods according to embodiments.

As noted above, phase 102 includes analyzing the raw encoded text thereby to identify text chunks based on a recorded set of delimiters/markers, with the delimiters/markers optionally being derived from a learning method. FIG. 2 and FIG. 3 illustrate exemplary learning methods. These each leverage a set of comparison files generated using the application responsible for generating the document of unknown or unspecified format.

In overview, the approach of FIG. 2 leverages a set of comparison files having controlled content. In the present example, method 200 includes the creation of a plurality of comparison files using the native application for the unknown file format. Specifically, step 201 includes creating an empty (text free) document, which is saved as file 205. A first paragraph of text is added to the empty document at 202, and a new document 206 saved. A second paragraph of text is added immediately following the first paragraph at 203, and a new document 207 saved. A third paragraph of text is added between the first and second paragraphs at 204, and a new document 208 saved. These four documents are used as comparison documents in method 210, which is a method performed by an analysis application (optionally being a component of the application used for method 100).

Method 210 includes, at step 211, importing the comparison files (in raw encoded format). Differences between the documents are identified at step 212, thereby to determine delimiters/markers at 213, such as elements in the raw encoded text that indicate breaks between paragraphs. These delimiters/markers are recorded for use in phase 102 of method 100.

It will be appreciated that method 200 is exemplary only, and that other approaches for creating a set of comparison documents may be used. The general approach is to create sufficient information to allow identification of patterns which are indicative of delimiters/markers (for example based on anticipated paragraph breaks and the like).

Method 210 is reliant on access to the native application. This, of course, will not always be possible. As an alternative, the approach of FIG. 3 leverages a set of pre-existing comparison documents in the unknown format, each of these documents including portions of known text. In particular, a user supplies a plurality of pre-existing sample files 302a to 302i at 301 (with i being used to designate an arbitrary final). The number of sample files varies between embodiments, and it will be appreciated that a greater number is preferable. However, as few as 3-4 is in some cases adequate. The user also provides known text data, being portions of text known to exist in each of the documents. It will be appreciated that the more known text data provided, the more effective the analysis.

Method 310 is performed by an analysis application. Step 311 includes importing the comparison files (as raw encoded text) and known text data. The raw encoded text is then processed at 312 using a set of known decompression algorithms such as, but not limited to: zlib, LZH, LZW, LZMA, BZ2, deflate and Huffman coding, character encoding detection per FIG. 5, and other operations for the purpose of identifying the known text data. This allows for determination of markers/delimiters at 313, which are recorded at 314.

It will be appreciated that the approaches of FIG. 2 and FIG. 3 are exemplary only, and that other methods for identifying delimiters/markers are used in further embodiments. For example, methods involving pattern identification are optionally used.

Representative Compression Identification Analysis

Figure 4:
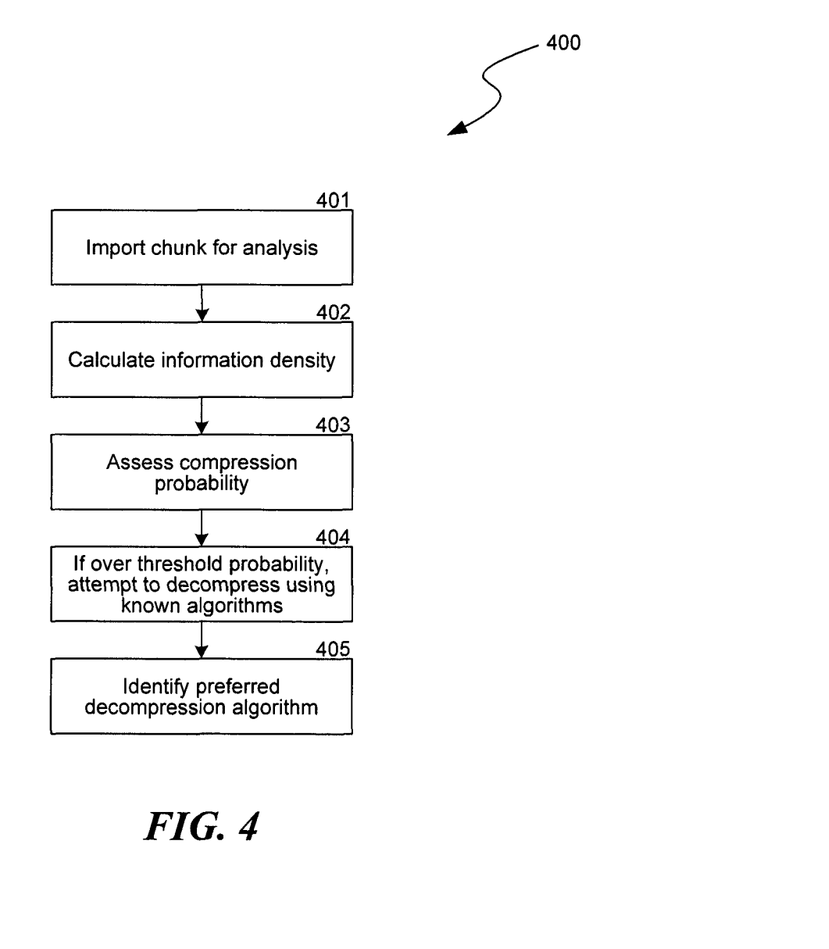
FIG. 4 schematically illustrates a method according to one embodiment.

As noted, decompression phase 103 includes performing, in respect of a given chunk, compression identification analysis to determine whether compression is likely and, in the event that compression is likely, performing a decompression process.

FIG. 4 illustrates a compression identification process 400 according to one embodiment. Step 401 includes importing a chunk for analysis. This chunk is then assessed to calculate information density for the chunk, which can be achieved using various known techniques. For example, information theory techniques based on Shanon Entropy are used in some embodiments. This information density is then compared with a predefined threshold at 403. In the event that the information density is less than that threshold, it is determined that compression is unlikely to be present. In the event that the information density is greater than the predetermined threshold, phase 103 includes determining that compression is likely, in which case the method progresses to step 404.

Step 404 includes applying a plurality of known decompression algorithms, such as Zlib, LZH, LZW, LZMA, BZ2, Gzip, Huffman coding and Plaintext. Based on the outcomes of these, a best result is identified, and from this a preferred decompression algorithm is identified. For example, this may be achieved by recalculating information density for the output of each decompression algorithm, and comparing results.

Representative Encoding Identification

Figure 5:
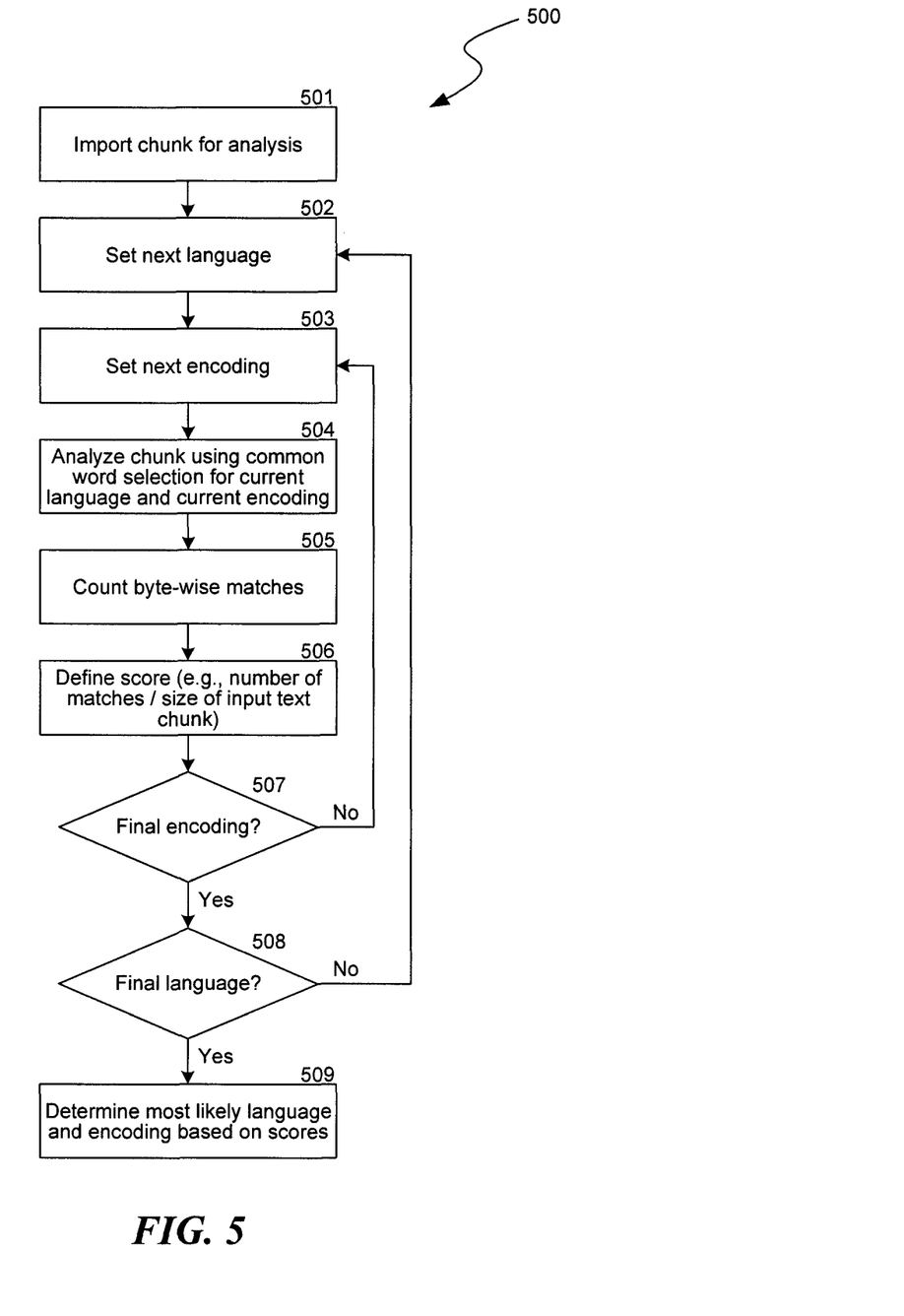
FIG. 5 schematically illustrates a method according to one embodiment.

As noted, encoding identification phase 104 includes, for a given chunk (decompressed, if required at phase 103), performing an encoding identification process thereby to identify a likely character encoding protocol. FIG. 5 illustrates an exemplary encoding identification process 500.

Step 501 includes importing a chunk for analysis. A language (e.g. English, French, Mandarin, etc.) is selected and set at 502, and an encoding protocol (such as ASCII, Big5, HKSCS, ANSEL, etc.) is selected and set at 503.

This method leverages a common word selection, for example the most common 300 words in the relevant language as represented in the relevant character encoding. It will be appreciated that greater or fewer numbers of common words are used in other embodiments. Step 504 includes analyzing the chunk based on the common word selection for the set language/encoding combination, with byte-wise matches being counted at 505 and a score defined at 506. For example, the score may be defined by the number of total matches/size of the input text chunk. The method then selectively loops based on decisions 507 and 508 until all language/encoding combinations have been scored.

The scores are subsequently compared at step 509 thereby to determine the most likely language/encoding combination (in essence being the combination which results in the greatest number of matches). This encoding protocol is subsequently used to decode the decompressed raw encoded text, thereby to allow conversion to meaningful human-readable text.

Representative Non-Learning Method

Figure 6:
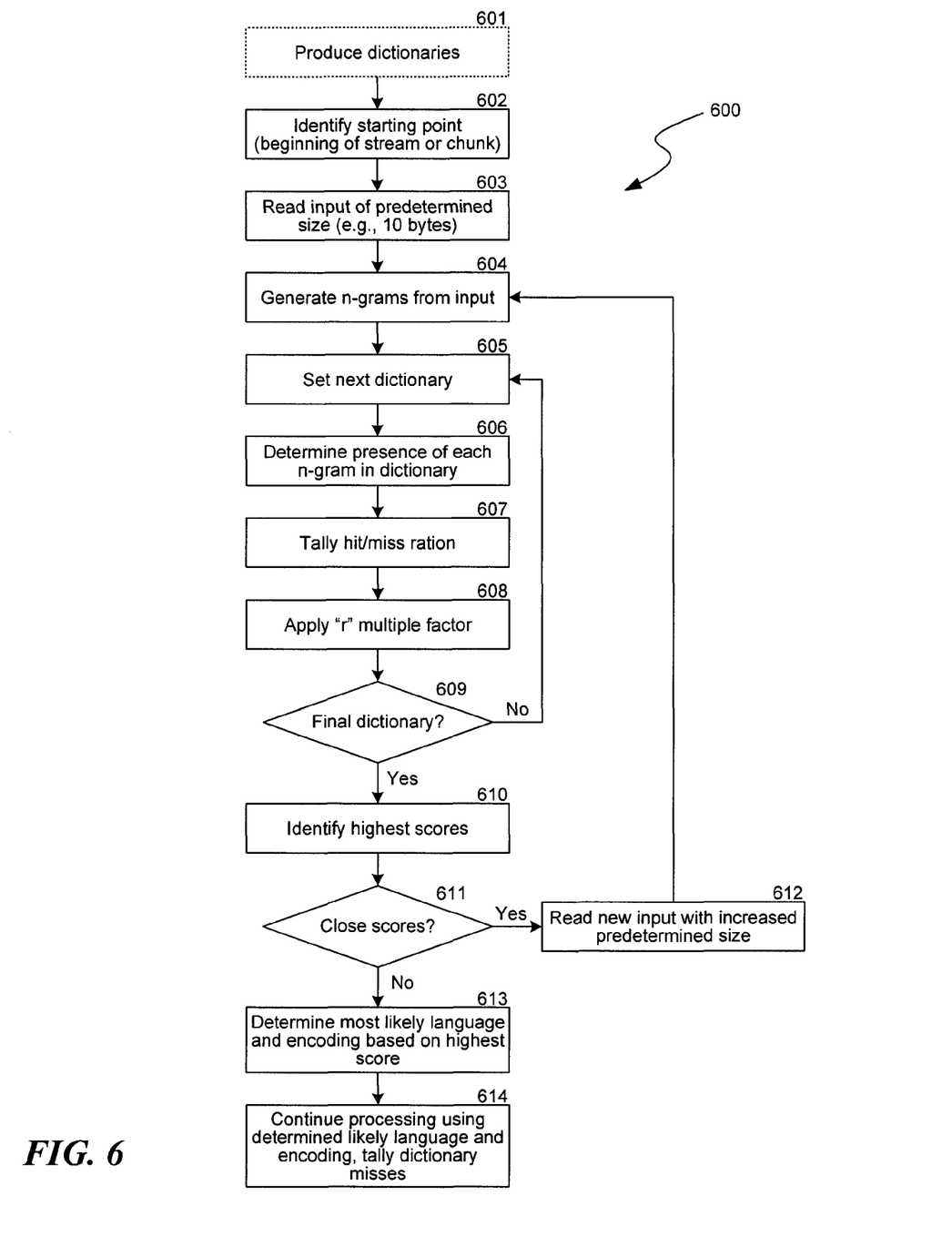
FIG. 6 schematically illustrates a method according to one embodiment.

In some embodiments, an "n-gram" frequency distribution approach may be used, as discussed below by reference to method 600 of FIG. 6. It will be appreciated that this method may be applied within method 100, or separately. In particular, it will be appreciated that phase 102 is not necessary for the performance of method 600 in the context of document processing.

Functional block 600 represents a processing including producing and maintaining a set of existential "dictionaries". These are subsequently used to look up the presence (i.e. in terms of yes/no) of a given n-gram in a particular language/character encoding combination (such encoding combinations including the likes of English/UCS2, English/ANSI, Chinese/Big5, Chinese/UTF8, Chinese/UCS2, and so on). These dictionaries are created in advance of any unknown document format processing, hence block 601 is defined by a dashed border to indicate that it represents an initial configuration process which may be performed temporally spaced apart from other processes. Characteristics of dictionaries for this embodiment are discussed below.

In this embodiment, there is one dictionary per language/encoding combination. "n" is defined uniquely for each dictionary, e.g. 4 bytes for UCS2 Chinese, 8 bytes for UTF8 Chinese, 3 bytes for French, and so on. The dictionary is then populated with n-grams obtained from, for example, a freely available, public source of content (e.g. Wikipedia). HTML tags are stripped, white space, punctuation and case are preserved. n-grams are stored as overlapped characters (e.g. AB, BC, CD, etc—aligned on character boundaries). In some cases an option is taken to strip Latin characters from CJK (Chinese/Japanese/Korean) sources.

In terms of using the dictionaries, the crux is to ask the question "is this n-gram (x) present in this particular dictionary (y)?"

Method 600 optionally deals with compression at an outermost level by attempting to decompress an entire stream (i.e. process the entire stream as one chunk), or identify chunks using previously described methods.

Functional block 602 represents a process including identifying a starting point. This may be the beginning of a stream, or the beginning of a chunk. Functional block 603 represents a process including reading an input portion of the raw encoded text beginning at the starting point. The input portion has a predetermined size, preferably in the order of 4 to 20 bytes, for example about 10 bytes.

Functional block 604 represents a process including processing the input portion, thereby to generate a set of n-grams. For example, an input stream of ABCDEF generates the following 2-grams (bigrams): AB BC CD DE EF.

Functional block 605 represents a process including setting a next one of the dictionaries, on the first occasion being a first of the dictionaries. For that dictionary, as represented by functional block 606, each n-gram is sent to the dictionary to determine whether there is a match. The process includes tallying the matches between the generated n-grams and known n-grams, thereby to define a score for that dictionary. This score may be numerical, in the form of a ration of hits to misses, or of another form. Functional block 607 represents a process including normalizing the score. For example, one embodiment is to apply an "r" multiplier factor—an empirical constant measured during creation of each dictionary (in essence a normalizing factor so that the numbers returning from each dictionary are directly comparable). This is calculated by feeding known inputs (language & encoding) into their appropriate dictionary to determine "natural" hit/miss ratio of the n-gram lookups. It is a factor that is a function of, and stored with, each dictionary.

Based on decision 609, the method either loops back to 605 for another dictionary or, in the case that all dictionaries have been used, continuing to 610.

Functional block 610 represents a process including determining a most language/protocol combination based on the relative scores (i.e. the combination of the dictionary with highest score). If the highest scores are close based on a predetermined threshold at decision 611, a larger input is read and the method loops to 604. It will be appreciated that this loop may be repeated until a clear "winner" (i.e. highest score) is identified in terms of language/encoding combinations.

A likely language/encoding combination is identified at 613. This combination is used at 614 to continue processing. Dictionary misses are tallied, thereby to assist in identifying portions that are non-text, and/or determine whether to revert to 602 to re-assess language/encoding possibilities. In some embodiments paragraph markers are inserted into the output based on distance between state transitions from text to non-text (for example x bytes since last text/not-text determination).

Conclusions and Interpretation

It will be appreciated that the disclosure above provides various significant systems and methods for processing documents of unknown or unspecified format.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Thus, one embodiment of each of the methods described herein is in the form of a computer-readable carrier medium carrying a set of instructions, e.g., a computer program that is for execution on one or more processors, e.g., one or more processors that are part of a web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be particular embodiments of the technology disclosed herein, those skilled in the art will recognize that other and further modifications may be made thereto without departing from the technology, and it is intended to claim all such changes and modifications as falling within the scope of the technology. For example, any formulas given above are merely representative of procedures that may be used. Functionality may be added or deleted from the block diagrams and operations may be interchanged among functional blocks. Steps may be added or deleted to methods described within the scope of the present technology.

We claim:

1. A computer implemented method for extracting meaningful text from a document of unknown or unspecified format, comprising:
   reading the document to extract raw encoded text;
   analyzing the raw encoded text to identify one or more text chunks; and
   for a text chunk of the one or more text chunks:
      performing a compression identification analysis to determine whether compression is likely and, if compression is likely, performing a decompression process;
      performing an encoding identification process to identify a likely character encoding protocol; and
      converting the text chunk using the identified likely character encoding protocol to output the text chunk as readable text,
   wherein the encoding identification process includes, for each protocol of a plurality of encoding protocols, using a common word selection of words in each protocol to identify matches.

2. The method of claim 1, wherein the compression identification analysis and the encoding identification process are performed for each text chunk.

3. The method of claim 2, wherein the compression identification analysis and the encoding identification process are performed in a modified manner for one or more later text chunks based on input indicative of a result of the compression identification analysis and the encoding identification process for one or more earlier text chunks.

4. The method of claim 1, wherein the analyzing the raw encoded text to identify the one or more text chunks is based on a recorded set of delimiters/markers.

5. The method of claim 4, wherein the recorded set of delimiters/markers are derived from a learning method.

6. The method of claim 5, wherein the learning method leverages a set of comparison files generated using an application responsible for generating the document of unknown or unspecified format.

7. The method of claim 6, wherein the set of comparison files has controlled content.

8. The method of claim 6, wherein the set of comparison files includes portions of known text.

9. The method of claim 1, wherein the compression identification analysis includes calculating an information density and, if the information density is greater than a predetermined threshold, determining that compression is likely.

10. The method of claim 1, wherein the decompression process includes applying a plurality of decompression algorithms and determining which of those decompression algorithms provides a best result, wherein the best result is issued as input for the encoding identification process.

11. The method of claim 1, wherein the likely encoding protocol is identified as that with the most matches.

12. A computer implemented method for extracting meaningful text from a document of unknown or unspecified format, comprising:
   reading the document to extract raw encoded text;
   analyzing the raw encoded text to identify one or more text chunks; and
   for a text chunk of the one or more text chunks:

performing a compression identification analysis to determine whether compression is likely and, if compression is likely, performing a decompression process;

performing an encoding identification process to identify a likely character encoding protocol; and converting the text chunk using the identified likely character encoding protocol to output the text chunk as readable text, wherein the encoding identification process includes:

setting a first language and character encoding protocol combination;

scoring the first language and character encoding protocol combination based on an identification of words from a common word selection for the first language and character encoding protocol combination;

repeating the scoring for additional language and character encoding protocol combinations; and identifying a likely language and character encoding protocol combination based on the relative scores.

13. A computer implemented method for extracting meaningful text from a document of unknown or unspecified format, comprising:

reading the document to extract raw encoded text;

analyzing the raw encoded text to identify one or more text chunks; and for a text chunk of the one or more text chunks:

performing a compression identification analysis to determine whether compression is likely and, if compression is likely, performing a decompression process;

performing an encoding identification process to identify a likely character encoding protocol; and converting the text chunk using the identified likely character encoding protocol to output the text chunk as readable text, wherein the encoding identification process includes, for each text chunk:

reading an input portion of the text chunk, the input portion having a first predetermined size;

processing the input portion to generate a set of n-grams;

for a plurality of dictionaries that each contain known n-grams in a respective language and character encoding protocol combination, tallying matches between the generated set of n-grams and the known n-grams to define a score for each of the plurality of dictionaries;

normalizing scores of the plurality of dictionaries; and identifying a likely language and character encoding protocol combination based on the relative scores.

14. The method of claim 13, wherein, if there is a plurality of highest scores in a predetermined range, the method includes:

reading a further input portion of the text chunk, the further input portion having a second predetermined size which is greater than the first predetermined size;

processing the further input portion to generate a set of n-grams;

for the plurality of dictionaries that each contain known n-grams in a respective language and character encoding protocol combination, tallying matches between the generated set of n-grams and the known n-grams thereby to define a score for each of the plurality of dictionaries;

normalizing scores of the plurality of dictionaries; and identifying a likely language and character encoding protocol combination based on the relative scores.

15. The method of claim 14, further comprising, repeating the method of claim 14 for a third predetermined size greater than the second predetermined size if there is a plurality of highest scores in a predetermined range.

16. The method of claim 14, wherein the raw encoded text is defined as a single text chunk.

17. A computer implemented method for extracting meaningful text from a document of unknown or unspecified format, comprising:

reading the document to extract raw encoded text;

analyzing the raw encoded text to identify one or more text chunks; and for a text chunk of the one or more text chunks:

performing a compression identification analysis to determine whether compression is likely and, if compression is likely, performing a decompression process;

performing an encoding identification process to identify a likely character encoding protocol; and converting the text chunk using the identified likely character encoding protocol to output the text chunk as readable text, wherein the analyzing the raw encoded text to identify the one or more text chucks is based on a recorded set of delimiters/markers derived from a learning method leveraging a set of comparison files generated using an application responsible for generating the document of unknown or unspecified format, the set of comparison files including:

an empty document;

a first document defined by a first paragraph of text;

a second document defined by the first paragraph of text followed immediately by a second paragraph of text; and a third document defined by the first paragraph of text followed immediately by a third paragraph of text, followed immediately by the second paragraph of text.

18. The method of claim 1, wherein the document of unknown or unspecified format includes non-text data.

19. The method of claim 1, wherein the analyzing includes determining whether the one or more text chunks are indicative of non-text data.

20. The method of claim 19, further comprising excluding the one or more text chunks from the output upon a determination that the one or more text chunks are indicative of non-text data.

21. The method of claim 19, further comprising passing the one or more text chunks to a component operative to recognize a format of the one or more text chunks indicative of non-text data.

22. The method of claim 1, further comprising providing the readable text to at least one of a search engine for searching and a text application available in a client device for rendering the readable text in a text document.

* * * * *